United States Patent [19]
Kakkar

[11] Patent Number: 5,712,972
[45] Date of Patent: Jan. 27, 1998

[54] IDENTIFICATION OF FAULTS IN DATA PATHS AND FUNCTIONAL UNITS OF A CENTRAL PROCESSING UNIT BY A SYSTEMATIC EXECUTION OF TEST INSTRUCTIONS

[75] Inventor: Sunil Kakkar, San Jose, Calif.

[73] Assignees: Sony Corporation, Tokyo, Japan; Sony Electronics, Inc., Park Ridge, N.J.

[21] Appl. No.: 483,604

[22] Filed: Jun. 7, 1995

[51] Int. Cl.$^6$ .................................................. G06F 13/00
[52] U.S. Cl. ........................................................ 395/183.02
[58] Field of Search ........................... 395/183.02, 182.03, 395/183.04, 183.06, 183.07, 183.19, 183.16, 182.08, 185.01; 371/16.1

[56] References Cited

U.S. PATENT DOCUMENTS

| | | | |
|---|---|---|---|
| 4,095,094 | 6/1978 | Strugger et al. | 234/304.1 |
| 4,729,096 | 3/1988 | Larson | 364/300 |
| 4,881,228 | 11/1989 | Shouda | 371/19 |
| 4,933,941 | 6/1990 | Eckard et al. | 371/18 |
| 5,005,172 | 4/1991 | Kawamoto | 371/18 |
| 5,050,168 | 9/1991 | Paterson | 371/19 |
| 5,088,022 | 2/1992 | Iwata | 395/325 |
| 5,185,867 | 2/1993 | Ito | 395/375 |
| 5,233,611 | 8/1993 | Triantafyllos et al. | 371/16.1 |
| 5,359,546 | 10/1994 | Hayes et al. | 364/579 |
| 5,426,648 | 6/1995 | Simamura | 371/19 |
| 5,442,777 | 8/1995 | Nakajima et al. | 395/182.18 |
| 5,475,843 | 12/1995 | Halviatti et al. | 395/700 |
| 5,544,310 | 8/1996 | Foreman et al. | 395/183.07 |
| 5,544,311 | 8/1996 | Harenberg et al. | 395/183.16 |

FOREIGN PATENT DOCUMENTS

594888A1  4/1994  European Pat. Off. ......... G06F 11/00

OTHER PUBLICATIONS

Weeks, Is Your Code Done Yet?, Computer Language, Apr. 1992, at 63.

Lumpp, Jr., Design of a System for Software Testing and Debugging for Multi-processor Avionics Systems, 1991, Comp. Software and Applications Conf., at 261.

Clapp et al., Analysis of Large System Black-Box Test Data, 1992 Software Reliability Engineering Symposium, at 94.

Automator QA Programmer Reference Manual (1991) by Direct Technology, at 1-7, 3-47, 4-24 to 4-25

Automator QA Developer Guide with Examples (1991) by Direct Technology, at 1-4, to 1-8, 1-12 to 1-15, 4-21 to 4-24, 5-24 to 5-34.

(List continued on next page.)

*Primary Examiner*—Robert W. Beausoliel, Jr.
*Assistant Examiner*—Norman M. Wright
*Attorney, Agent, or Firm*—Wood, Herron & Evans,L.L.P.

[57] ABSTRACT

A systematically structured diagnostic for detecting, isolating, analyzing and reporting problems or faults in a central processing unit. The diagnostic causes the central processing unit to execute instructions, the instructions being selected such that the central processing unit, in executing the instructions, must use every data path and functional unit therein. Errors caused by particular instructions are correlated with the functional units or datapaths used by those instructions, to produce a list of possibly faulty datapaths and functional units. Test procedures, specifically designed to the possibly faulty datapaths and functional units, are then applied to the central processing unit to isolate which of the possibly faulty data paths or functional units are in fact faulty, which are then reported. The instructions, test procedures and other information used by the diagnostic are stored in databases, so that the diagnostic has a modular and data-driven structure which permits evolution of the diagnostic over time as the central processing unit layout changes and the diagnostic is upgraded to provide higher levels of fault-detection functionality.

21 Claims, 1 Drawing Sheet

OTHER PUBLICATIONS

Kirani, Comparative Evaluation of Expert System Testing Methods, 1992 IEEE International Conference on Tools with AI, at 334.

Beizer, Software System Testing and Quality Assurance (1984) at 91–140.

Myers, Art of Software Testing (1979) at 56–69.

Horgan et al., Comparative Evaluation of Expert System Testing Methods, 1992 IEEE International Conference on Tools with AI at 334.

Automator QA User Guide (1991) by Direct Technology, at 2-2, 3-8 to 3-9, 5-1 to 5-6, A-4 to A-6.

IDENTIFICATION OF FAULTS IN DATA PATHS AND FUNCTIONAL UNITS OF A CENTRAL PROCESSING UNIT BY A SYSTEMATIC EXECUTION OF TEST INSTRUCTIONS

FIELD OF THE INVENTION

The present invention relates to diagnostic procedures used during manufacture of central processing units.

BACKGROUND OF THE INVENTION

The central processing unit of a computer system may have many different kinds of flaws. Flaws may occur in the semiconductor chip that carries the microprocessor, or may occur in the wiring and peripheral chips on the circuit board to which the microprocessor is mounted. Accordingly, during manufacture of computer equipment, it is necessary to test all of these areas for potential flaws.

As the complexity of computers has increased, it has become increasingly difficult to conclusively test the central processing unit (CPU) of a computer system for the absence of manufacturing flaws. Known diagnostic tests are often performed in a non-systematic manner and as a do not discover all possible flaws.

At the same time that computer systems have increased in complexity, purchasers of computer equipment have increasingly demanded absolutely error-free operation of computer systems. Recently, flaws in computer systems have led to embarrassing recalls by major computer equipment manufacturers.

SUMMARY OF THE INVENTION

The invention overcomes these difficulties by providing a systematic procedure for detecting, isolating, analyzing and reporting flaws in a central processing unit such as a microprocessor chip or a microprocessor chip and its peripheral hardware and software on a CPU board of a computer system. Principles of the present invention may be applied to each of these applications with equal benefit.

Specifically, in accordance with principles of the present invention, a diagnostic program works in connection with three databases to detect, isolate and analyze faults in a CPU. The first database includes instructions; the instructions cause the central processing unit to use every data path and functional element therein. To test the CPU, every instruction in the first database is executed by the CPU, and a log is kept of any errors which result. The second database correlates each of the errors to functional elements and datapaths of the CPU which may have caused the error, to form a second log of possibly faulty functional units and/or data paths in the CPU. The third database includes specific test procedures, each of which causes the CPU to use specific data paths and functional units. The test procedures also include a test for determining whether a data path or functional unit used by the CPU during the test procedure is faulty. Using the second log of possibly faulty functional units and/or data paths in the CPU, test procedures which test these specific functional units and/or data paths are selected from the third database, and the selected test procedures are performed by the CPU. The result is a third log of specific functional units and data paths indicated to be faulty by tests performed by the test procedures.

In a specific embodiment, a fourth database is used. This database includes error messages identifying the nature of a specific fault or group of faults. When, by the preceding steps, the diagnostic procedure produces a log of specific functional units and data paths which are faulty, the corresponding error messages are selected from the fourth database and the error messages are reported to an operator in human-readable fashion, such as by display on a display screen or printing on a printer.

The first database may also include expected values, indicating the results which would be generated by a non-faulty CPU in response to the instructions preceding the expected value. These expected values are used, along with the instructions themselves, to identify when errors have occurred and add error messages to the first log.

When an error is generated in response to an instruction, the first log may identify, in addition to the error and/or instruction which caused it, information on the state of the CPU such as the contents of the hardware registers in the CPU at the time of the error, which may aid in pinpointing the source of the error.

In accordance with principles of the present invention, the diagnostic has a data-driven, modular structure, which facilitates updating and upgrading of the diagnostic procedures. Specifically, one aspect of operation the diagnostic may be changed with little or no modification to the remaining aspects of the diagnostic. For example, the test procedures in the third database may be enhanced or improved without requiring modification of the software which causes these test procedures to be performed, nor modification of the first and second databases. Further, the error messages produced in accordance with the invention may be altered for different uses; for example, if the invention is used by a computer maintenance technician, the error messages may simply indicate which of several circuit boards or chips is to be replaced to restore correct operation, possibly along with an error code to be noted in a repair log. However, if the invention is used by a hardware design engineer, the error messages may provide detailed information on the specific error detected and the location it was detected so that the engineer may, as necessary, undertake a detailed debugging/redesign effort.

The invention encompasses the diagnostic method identified above and also the apparatus (computer system, object code and databases) used to perform this method.

The above and other objects and advantages of the present invention shall be made apparent from the accompanying drawings and the description thereof.

BRIEF DESCRIPTION OF THE DRAWING

The sole accompanying FIGURE, which is incorporated in and constitutes a part of this specification, is a flow chart of the steps of a systematic diagnostic procedure, and the data structures used by this procedure, in accordance with principles of the present invention. This FIGURE illustrates embodiments of the invention and, together with a general description of the invention given above, and the detailed description of the embodiments given below, serves to explain the principles of the invention.

DETAILED DESCRIPTION OF SPECIFIC EMBODIMENTS

Figure 1:
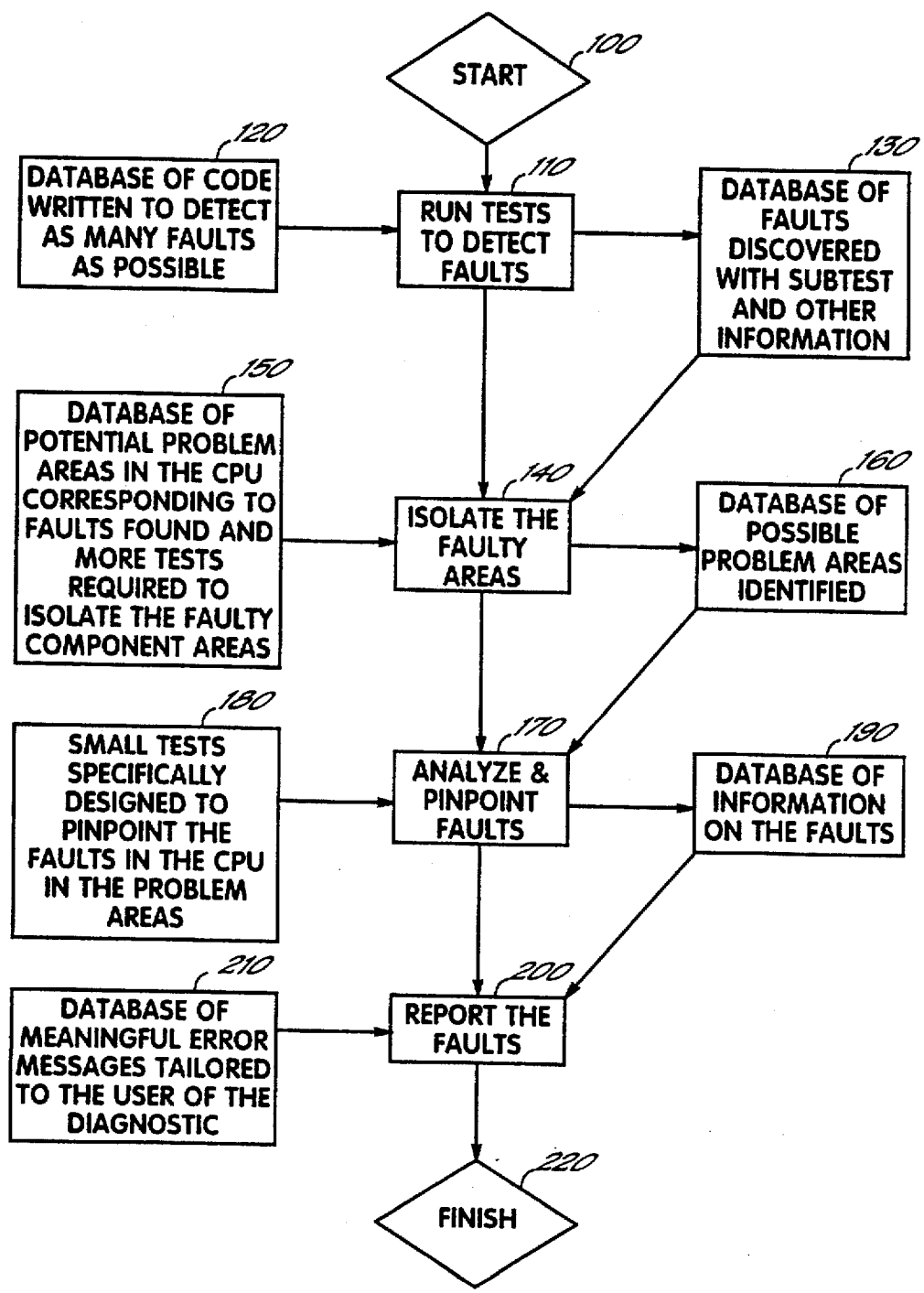

Referring now to the FIGURE, a diagnostic procedure in accordance with the present invention proceeds from its start point 100 to a first step 110 in which the diagnostic procedure causes the CPU to perform a sequence of instructions to detect faults in the CPU. The emphasis in this step is to detect or discover the maximum number of faults in the CPU without focussing on the exact cause, i.e., component or functional unit, which is producing the fault or the exact conditions which must be present to create the fault. Rather, the focus is on identifying those general areas which, under some set of conditions, have created a fault.

To achieve this goal, the diagnostic procedure includes a database 120 containing thousands of lines of pseudo-randomly generated sequences of instructions, obeying the validity constraints of the CPU. These instructions are generated in a somewhat random fashion, although they are generated in way that ensures that the instructions include all allowable instructions or operations with a wide range of operands, without introducing unnecessary redundancy. The instructions are written to ensure that all of the data paths of the CPU are used by the instructions and that the instructions make use of every functional element of the CPU such as the arithmetic logic unit (ALU), cache, pipeline scheduling, and data memory addressing (DMA). The instructions in the first database are also exhaustive enough to cover all synchronous and asynchronous events that can occur during an execution cycle.

In addition to the pseudo-random lines of instructions described above, there are groups of instructions which form, collectively, hardware exercises, stress tests and reliability test procedures that are designed specifically for the architecture of the CPU, with knowledge of its potential flaws (e.g., areas in which design parameters are at close tolerances and sensitive to variations), so as to highlight any faulty operation in these areas.

The instructions may also include groups of instructions aimed at exercising each of the features of the CPU, such as its interrupt processing, processing of instructions in branch delay slots, etc.

The database 110 also includes, interspersed with the instructions at a regular frequency, expected value checks, i.e., instructions which cause the CPU to check the currently-generated results held in hardware registers or memory, to values that should be found in hardware registers or memory after completion of the instructions preceding the expected value check.

The code in database 110 is written to run in a reasonable amount of time, i.e., no longer than is needed to meet each of the identified requirements. To do so, the code takes advantage, where applicable, of all hardware assists, provided for the convenience of testing the hardware, which may include hooks or switches which induce parity errors, error correction coding (ECC) faults, bus errors, external interrupts and concurrent DMA cycles. Every effort is made to test the hardware operation concurrently with these asynchronous events and every effort is made to cause multiple simultaneous external events during different cycles of the hardware execution.

The instructions in database 110 are grouped into subtests or segments, each having a specific serial number which is stored in a single register of the CPU during operation of the diagnostic procedure. Whenever an error is detected during an instruction or during the performance of an expected value check, the current serial number is read from this register and stored in a log 130. At the same time, as appropriate, other information is stored into log 130, such as the error code produced by the CPU, the current interrupt vector, the current values of the program counter and/or stack pointer, the current value of various registers, and/or the numbers of the registers that were inconsistent at the time of the expected value check.

Thus, at the completion of the first step 110 of the diagnostic, the diagnostic has produced a log 130 identifying a list of logged errors, each indicating at least the group of instructions or subtest in which the error was detected.

Subsequent to the first step 110, the diagnostic procedure continues to a second step 140 in which the errors detected in the first step are evaluated to isolate those areas of the CPU which are faulty. In this step, the diagnostic makes reference to a database 150 which identifies potential problem areas in the CPU and correlates these problem areas to those subtests in the database 120 which would generate an error as a result of the specific enumerated problems. Database 150 also may include specific tests to determine which of a collection of potential problem areas are the actual cause of a fault, in order to isolate the problem area.

In step 140, the diagnostic correlates the errors logged in log 130 using the database 150 to produce a database 160 of specific problem areas. In this step, the diagnostic uses the subtest numbers in database 130 to retrieve, from database 150, entries indicating possible problem areas that might lead to that errors during that subtest. By correlating the resulting entries, the specific problem areas are identified and logged in log 160.

In the subsequent step 170, the diagnostic applies specific tests to each of the problem areas identified in log 160 to pinpoint the source of the fault. The step makes use of a database 180 of small tests. Each small test is written to cover all aspects of a specific problem area that may be isolated in step 140. For example, if a possible problem is detected in the ALU, but the instruction causing the problem is unknown, database 180 will include detailed instruction tests for each instruction with an exhaustive set of operand values so as to cover all of the possible cases that could produce a unique failure. As another example, if the CPU pipeline scheduling seems to have a problem, then tests in database 180 will be run to verify all aspects of pipeline scheduling both under synchronous and asynchronous conditions such as external interrupts.

As each small test is performed to evaluate the potential problem areas identified in log 160, the diagnostic produces information on specific faults located and stores this information in a log 190. As a result, when step 170 is completed, log 190 contains a listing of specific faults located.

The located faults are reported in step 200. Reporting the discovered faults is a crucial step in the diagnostic, because there is a wide variety of persons to whom the fault could be reported. For example, hardware design engineers, manufacturing engineers, field maintenance technicians, or non-technical users of a computer system using the CPU are all potential recipients of the messages reported in step 200.

A manufacturing engineer may be interested in learning the specifics of a fault with respect to the physical layout of a CPU chip or a printed circuit board carrying the CPU, whereas a field maintenance technician may only be interested in known which board of a CPU should be swapped to restore satisfactory operation, without any detail on the source of the error.

Accordingly, in step 200 the diagnostic accesses a database 210 containing meaningful error messages tailored to the needs of the user of the diagnostic. Each message describes a specific fault that can be pinpointed in step 170 and identified in log 190. The messages corresponding to the faults identified in log 190 are selected from the database 210 and delivered to the operator, e.g. by displaying the messages on a screen, printing the messages on a printer, or by generating a disk or memory file containing the text of the message. The diagnostic is then finished 220.

It will be understood from the foregoing that the diagnostic procedure has a modular, object-oriented, data-driven structure. This structure permits substantial modifications to each portion of the diagnostic without substantially affecting other portions of the diagnostic. For example, additional tests can be easily added to the various databases 120, 150, 180 to expand the diagnostic without rewriting the core processing steps 110, 140, 170 and 200.

Thus, hardware revisions to the CPU can be easily reflected in the structure of the diagnostic with reduced rework. Furthermore, as the diagnostic is improved and updated with use (i.e., as it is rewritten to correct faults in its operation or to ensure coverage of instructions, data paths, and fault conditions not initially covered), the diagnostic may be revised by simply updating data files without recompilation and relinking of the object code which performs steps 110, 140, 170 and 200.

It will also be noted that the structure of the diagnostic is such that the hardware registers in the CPU can be directly accessed during the diagnostic to provide a check and permit debugging of both the CPU and the diagnostic itself.

Furthermore, it will be noted that, as the diagnostic is in development, the diagnostic may be written to identify faults in only a general way, and include messages in database 210 which generally identifying a fault area and indicate possible additional tests that can be run after completion of the diagnostic to pinpoint the fault. These general messages may be replaced over time as the diagnostic is refined to perform tests of increasing complexity.

Also, the diagnostic may produce messages that identify untested or untestable possible problem areas, e.g., when a small test in database 180 is unable to locate a fault despite the identification of a possible problem area in log 160.

Thus, the diagnostic is usable not only as a tool for diagnosing specific faults, but also as an expert guide for assisting in further activities to pursue as-yet undiagnosed problems.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A diagnostic method for locating faulty functional units and data paths in a central processing unit of a data processing circuit, said central processing unit having signal input and output terminals, said data paths connecting signals from and between said terminals and said functional units, said functional units modifying signals received though said data paths, comprising providing a first database of instructions, said instructions, when input as signals to terminals of said central processing unit, causing said central processing unit to use every data path and functional unit in said central processing unit, providing a second database correlating groups of said instructions to functional units and datapaths of said central processing unit which must be operating correctly to avoid an error during said groups of instructions, providing a third database of test procedures, each test procedure, when input as electrical signals to terminals of said central processing unit, causing the central processing unit to use specific data paths and functional units, and including a test for determining whether a data path or functional unit used by the central processing unit in response to said test procedure is faulty, said third database correlating said test procedures with specific data paths and functional units used in response to said test procedure, executing, in said central processing unit, each of said instructions in said first database by providing electrical signals corresponding to said instructions to terminals of said central processing unit, and forming a first log of errors identifying data paths and functional units which were found to be faulty during execution of said instructions, correlating groups of instructions which produced errors identified in said first log to said second database to form a second log of possibly faulty functional units and data paths in said central processing unit, selecting test procedures from said third database which are correlated to possibly faulty functional units and data paths identified by said second log, and performing, in said central processing unit, test procedures selected in the preceding step by providing electrical signals corresponding to said test procedures to terminals of said central processing unit, and forming a third log of those functional units and data paths indicated to be faulty by tests performed by said test procedures.

2. The method of claim 1 wherein said first database further comprises expected values indicating results which would be generated by a non-faulty central processing unit in response to instructions in said first database, said executing step includes comparing said expected values to electrical signals at terminals of said central processing unit indicative of results produced by said central processing unit in response to instructions in said first database, and if said values and results are not consistent, adding an error to said first log.

3. The method of claim 2 wherein said executing step forms said first log by generating, for at least one instruction which produces an error, information on the contents of registers in said central processing unit.

4. The method of claim 3 further comprising providing a fourth database of error messages identifying the nature of a fault, each said message being correlated to a possible fault in a functional unit or data path in said central processing unit, selecting error messages from said fourth database which are correlated to faulty functional units and data paths identified in said third log, and reporting said error messages.

5. The method of claim 4 wherein said error messages identify a functional unit or data path of said central processing unit which contains faulty circuitry.

6. The method of claim 1 wherein said executing step forms said first log by generating, for at least one instruction which produces an error, information on the contents of registers in said central processing unit.

7. The method of claim 6 further comprising providing a fourth database of error messages identifying the nature of a fault, each said message being correlated to a possible fault in a functional unit or data path in said central processing unit, selecting error messages from said fourth database which are correlated to faulty functional units and data paths identified in said third log, and reporting said error messages.

8. The method of claim 7 wherein said error messages identify a functional unit or data path of said central processing unit which contains faulty circuitry.

9. The method of claim 1 further comprising providing a fourth database of error messages identifying the nature of a fault, each said message being correlated to a possible fault in a functional unit or data path in said central processing unit, selecting error messages from said fourth database which are correlated to faulty functional units and data paths identified in said third log, and reporting said error messages.

10. The method of claim 9 wherein said error messages identify a functional unit or data path of said central processing unit which contains faulty circuitry.

11. Apparatus for locating faulty functional units and data paths in a central processing unit of a data processing circuit, said central processing unit having signal input and output terminals, said data paths connecting signals from and between said terminals and said functional units, said functional units modifying signals received through said data paths, comprising storage maintaining a first database of instructions, said instructions, when input as signals to terminals of said central processing unit, causing said central processing unit to use every data path and functional unit in said central processing unit, storage maintaining a second database correlating groups of said instructions to functional units and datapaths of said central processing unit which must be operating correctly to avoid an error during said groups of instructions, storage maintaining a third database of test procedures, each test procedure, when input as electrical signals to terminals of said central processing unit, causing the central processing unit to use specific data paths and functional units, and including a test for determining whether a data path or functional unit used by the central processing unit in response to said test procedure is faulty, said third database correlating said test procedures with specific data paths and functional units used in response to said test procedure, a diagnostic control circuit, said diagnostic control circuit causing said central processing unit to execute each of said instructions in said first database, by providing electrical signals corresponding to said instructions to terminals of said central processing unit, forming a first log of errors identifying data paths and functional units which were found to be faulty during execution of said instructions, correlating groups of instructions which produced errors identified in said first log to said second database to form a second log of possibly faulty functional units and data paths in said central processing unit, selecting test procedures from said third database which are correlated to possibly faulty functional units and data paths identified by said second log, and causing said central processing unit to perform test procedures selected in the preceding step, by providing electrical signals corresponding to said test procedures to terminals of said central processing unit, and forming a third log of those functional units and data paths indicated to be faulty by tests performed by said test procedures.

12. The apparatus of claim 11 wherein said first database further comprises expected values indicating results which would be generated by a non-faulty central processing unit in response to instructions in said first database, said diagnostic control circuit compares said expected values to electrical signals at terminals of said central processing unit indicative of results produced by said central processing unit in response to instructions in said first database, and if said values and results are not consistent, adds an error to said first log.

13. The apparatus of claim 12 wherein diagnostic control circuit forms said first log by generating, for at least one instruction which produces an error, information on the contents of registers in said central processing unit.

14. The apparatus of claim 13 further comprising storage maintaining a fourth database of error messages identifying the nature of a fault, each said message being correlated to a possible fault in a functional unit or data path in said central processing unit, and wherein said diagnostic control circuit selects error messages from said fourth database which are correlated to faulty functional units and data paths identified in said third log, and reports said error messages.

15. The apparatus of claim 14 wherein said error messages identify a functional unit or data path of said central processing unit which contains faulty circuitry.

16. The apparatus of claim 11 wherein diagnostic control circuit forms said first log by generating, for at least one instruction which produces an error, information on the contents of registers in said central processing unit.

17. The apparatus of claim 16 further comprising storage maintaining a fourth database of error messages identifying the nature of a fault, each said message being correlated to a possible fault in a functional unit or data path in said central processing unit, and wherein said diagnostic control circuit selects error messages from said fourth database which are correlated to faulty functional units and data paths identified in said third log, and reports said error messages.

18. The apparatus of claim 17 wherein said error messages identify a functional unit or data path of said central processing unit which contains faulty circuitry.

19. The apparatus of claim 11 further comprising storage maintaining a fourth database of error messages identifying the nature of a fault, each said message being correlated to a possible fault in a functional unit or data path in said central processing unit, and wherein said diagnostic control circuit selects error messages from said fourth database which are correlated to faulty functional units and data paths identified in said third log, and reports said error messages.

20. The apparatus of claim 19 wherein said error messages identify a functional unit or data path of said central processing unit which contains faulty circuitry.

21. The apparatus of claim 11 wherein said diagnostic control circuit comprises circuitry separate from and communicating with said central processing unit.

* * * * *

UNITED STATES PATENT AND TRADEMARK OFFICE
CERTIFICATE OF CORRECTION

PATENT NO.    : 5,712,972

DATED         : January 27, 1998

INVENTOR(S)   : Sunil Kakkar

It is certified that error appears in the above-identified patent and that said Letters Patent is hereby corrected as shown below:

Column 1, line 24, after "a" and before "do", insert --result--.

Column 3, line 11, after "in" and before way", insert --a--.

Column 4, line 19, replace "that" with --those--. (1st occur.)

Column 4, line 53, replace "known" with --knowing--.

Column 5, line 22, replace "identifying" with --identify--.

Column 5, line 55, replace "though" with --through--.

Signed and Sealed this

Twenty-second Day of September, 1998

Attest:

BRUCE LEHMAN

*Attesting Officer*          *Commissioner of Patents and Trademarks*